United States Patent
Ghosh et al.

(10) Patent No.: US 8,824,440 B2
(45) Date of Patent: Sep. 2, 2014

(54) METHOD, APPARATUS, AND COMPUTER PROGRAM PRODUCT FOR EFFICIENT TIM COMPRESSION AND DECODING

(75) Inventors: Chittabrata Ghosh, Union City, VA (US); Sayantan Choudhury, Berkeley, CA (US); Klaus Franz Doppler, Albany, CA (US); Taejoon Kim, Berkeley, CA (US)

(73) Assignee: Nokia Corporation, Espoo (FI)

( * ) Notice: Subject to any disclaimer, the term of this patent is extended or adjusted under 35 U.S.C. 154(b) by 156 days.

(21) Appl. No.: 13/462,244

(22) Filed: May 2, 2012

(65) Prior Publication Data

US 2013/0294261 A1    Nov. 7, 2013

(51) Int. Cl.
*H04W 4/00*    (2009.01)

(52) U.S. Cl.
USPC .......................................... 370/338

(58) Field of Classification Search
USPC ................................. 370/328–339
See application file for complete search history.

(56) References Cited

U.S. PATENT DOCUMENTS

| | | | |
|---|---|---|---|
| 2005/0288070 A1 | 12/2005 | Omori et al. | |
| 2008/0146253 A1* | 6/2008 | Wentink | 455/458 |
| 2013/0279405 A1* | 10/2013 | Jafarian et al. | 370/328 |

FOREIGN PATENT DOCUMENTS

| | | |
|---|---|---|
| EP | 1 684 465 A1 | 7/2006 |
| WO | WO 2010105114 A1 | 9/2010 |
| WO | WO 2013/066363 * | 5/2013 |

OTHER PUBLICATIONS

M. Park; Proposed Specification Framework for TGah; IEEE P802.11 Wireless LANs; Jan. 19, 2012; pp. 1-12.
Z. Jin, et al.; MAC considerations for 802.11ah (Probe and Pull MAC) IEEE 11-11/1512r4; Nov. 7, 2011; slides 1-19.
M. Park, et al., Intel Corp.; TGah Efficient TIM Encoding; IEEE 802.11.12/3880; pp. 1-26; Dated Mar. 14, 2012.
International Search Report for International Application No. PCT/FI2013/050399 mailed Aug. 21, 2013.
Minyoung Park, et. al.; TGah Efficient TIM Encoding; EEE 802.11-12/388r1. Submission. Intel Corp; Date: Mar. 14, 2012; pp. 1-26.

* cited by examiner

*Primary Examiner* — Frank Duong
(74) *Attorney, Agent, or Firm* — Locke Lord LLP

(57) ABSTRACT

Method, apparatus, and computer program product embodiments improve power saving in network environments. An example method embodiment comprises: generating in an access point device, a traffic indication map comprising a page bitmap field, a page control field, one or more block bitmap fields, and one or more sub-block bitmaps indicating wireless client devices having buffered data in the access point device available for them; and periodically broadcasting the traffic indication map in a beacon frame to the wireless client devices.

26 Claims, 8 Drawing Sheets

FIG. 2B

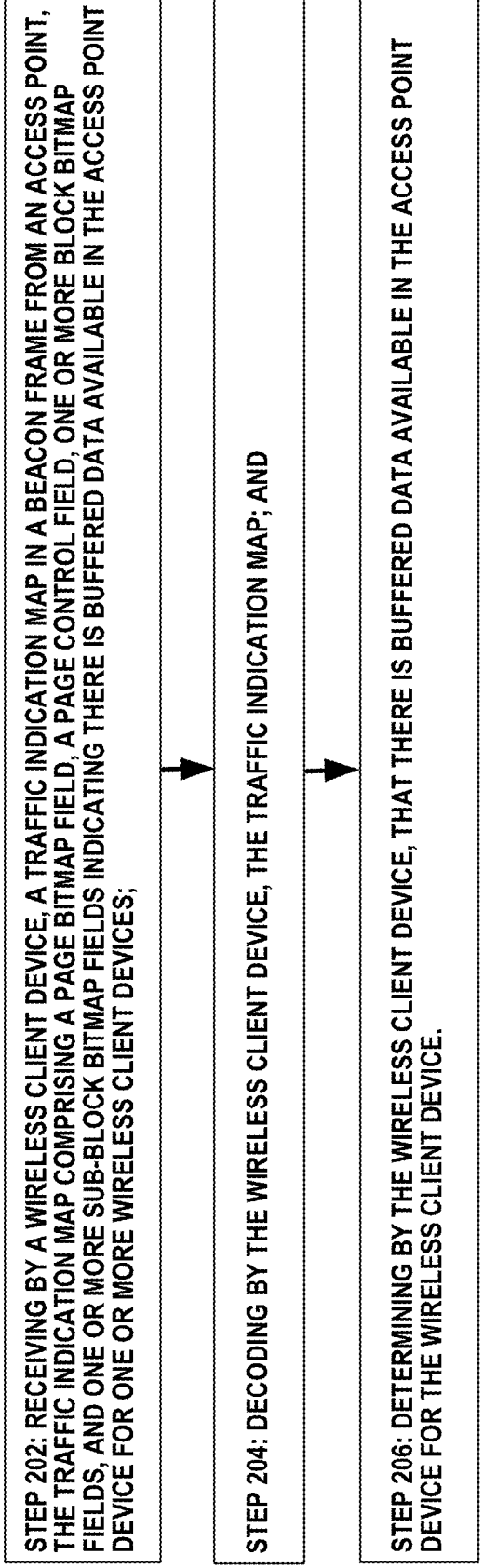

STEP 202: RECEIVING BY A WIRELESS CLIENT DEVICE, A TRAFFIC INDICATION MAP IN A BEACON FRAME FROM AN ACCESS POINT, THE TRAFFIC INDICATION MAP COMPRISING A PAGE BITMAP FIELD, A PAGE CONTROL FIELD, ONE OR MORE BLOCK BITMAP FIELDS, AND ONE OR MORE SUB-BLOCK BITMAP FIELDS INDICATING THERE IS BUFFERED DATA AVAILABLE IN THE ACCESS POINT DEVICE FOR ONE OR MORE WIRELESS CLIENT DEVICES;

STEP 204: DECODING BY THE WIRELESS CLIENT DEVICE, THE TRAFFIC INDICATION MAP; AND

STEP 206: DETERMINING BY THE WIRELESS CLIENT DEVICE, THAT THERE IS BUFFERED DATA AVAILABLE IN THE ACCESS POINT DEVICE FOR THE WIRELESS CLIENT DEVICE.

FIG. 3B

STEP 302: GENERATING IN AN ACCESS POINT DEVICE, A TRAFFIC INDICATION MAP COMPRISING A PAGE BITMAP FIELD, A PAGE CONTROL FIELD, ONE OR MORE BLOCK BITMAP FIELDS, AND ONE OR MORE SUB-BLOCK BITMAP FIELDS INDICATING WIRELESS CLIENT DEVICES HAVING BUFFERED DATA IN THE ACCESS POINT DEVICE AVAILABLE FOR THEM; AND

STEP 304: PERIODICALLY BROADCASTING THE TRAFFIC INDICATION MAP IN A BEACON FRAME TO THE WIRELESS CLIENT DEVICES.

METHOD, APPARATUS, AND COMPUTER PROGRAM PRODUCT FOR EFFICIENT TIM COMPRESSION AND DECODING

FIELD

The field of technology relates to wireless communication and more particularly to traffic indication map encoding and compression for power save in network environments.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for power saving in network environments.

An example embodiment of the invention includes a method comprising:

receiving by a wireless client device, a traffic indication map in a beacon frame from an access point, the traffic indication map comprising a page bitmap field, a page control field, and one or more block bitmap fields, indicating there is buffered data available in the access point device for one or more wireless client devices;

decoding by the wireless client device, the traffic indication map; and determining by the wireless client device, that there is buffered data available in the access point device for the wireless client device.

An example embodiment of the invention includes a method comprising:

wherein the one or more block bitmap fields represents presence or absence of buffered data for one or more sub-blocks with one or more wireless client devices and the page bitmap field indicates presence or absence of buffered data for each of the one or more blocks.

An example embodiment of the invention includes a method comprising:

wherein the page control field indicates a mode of encoding a traffic indication map for buffered data in each of the one or more blocks for the one or more wireless client devices and the page control field includes zero or more padding bits to fill out at least one or more octet.

An example embodiment of the invention includes a method comprising:

wherein the traffic indication map further comprises one or more sub-block bitmap fields representing one or more sub-blocks of the one or more wireless client devices, the one or more block bitmap fields represents the one or more sub-blocks, and the page bitmap field indicates presence of buffered data for each of the one or more blocks.

An example embodiment of the invention includes a method comprising:

wherein the page control field indicates a mode of encoding a traffic indication map for buffered data in each of the one or more blocks of one or more sub-blocks of one or more wireless client devices and the page control field includes zero or more padding bits to fill out at least one or more octet.

An example embodiment of the invention includes a method comprising:

wherein decoding required for a client device to read buffered data in the traffic indication map, is minimized when the page bitmap field indicates that there is no buffered data in a block associated with the device.

An example embodiment of the invention includes a method comprising:

wherein decoding required for a client device to read buffered data in the traffic indication map, is minimized because the page control field only contains control bits for those blocks identified by the page bitmap field as having buffered data waiting for the device.

An example embodiment of the invention includes a method comprising:

generating in an access point device, a traffic indication map comprising a page bitmap field, a page control field, and one or more block bitmap fields, indicating wireless client devices having buffered data in the access point device available for them; and periodically broadcasting the traffic indication map in a beacon frame to the wireless client devices.

An example embodiment of the invention includes a method comprising:

wherein the one or more block bitmap fields represents presence or absence of buffered data for one or more sub-blocks of the one or more wireless client devices and the page bitmap field indicates presence of buffered data for each of the one or more blocks.

An example embodiment of the invention includes a method comprising:

wherein the page control field indicates a mode of encoding a traffic indication map for buffered data in each of the one or more blocks of the one or more wireless client devices and the page control field includes zero or more padding bits to fill out at least one or more octet.

An example embodiment of the invention includes a method comprising:

wherein the traffic indication map further comprises one or more sub-block bitmap fields representing one or more sub-blocks of the one or more wireless client devices, the one or more block bitmap fields represents the one or more sub-blocks, and the page bitmap field indicates presence of buffered data for each of the one or more blocks.

An example embodiment of the invention includes a method comprising:

wherein the page control field indicates a mode of encoding a traffic indication map for buffered data in each of the one or more blocks of one or more sub-blocks of one or more wireless client devices and the page control field includes zero or more padding bits to fill out at least one or more octet.

An example embodiment of the invention includes an apparatus comprising:

at least one processor;

at least one memory including computer program code;

the at least one memory and the computer program code configured to, with the at least one processor, cause the apparatus at least to:

receive a traffic indication map in a beacon frame from an access point, the traffic indication map comprising a page bitmap field, a page control field, and one or more block bitmap fields, indicating there is buffered data available in the access point device for one or more wireless client devices;

decode the traffic indication map; and determine that there is buffered data available in the access point device for the apparatus.

An example embodiment of the invention includes an apparatus comprising:

wherein the one or more block bitmap fields represents one or more blocks of the one or more wireless client devices and the page bitmap field indicates presence of buffered data for each of the one or more blocks.

An example embodiment of the invention includes an apparatus comprising:

wherein the page control field indicates a mode of encoding a traffic indication map for buffered data in each of the one or more blocks of the one or more wireless client devices and the page control field includes zero or more padding bits to fill out at least one or more octet.

An example embodiment of the invention includes an apparatus comprising:

wherein the traffic indication map further comprises one or more sub-block bitmap fields representing one or more sub-blocks of the one or more wireless client devices, the one or more block bitmap fields represents the one or more sub-blocks, and the page bitmap field indicates presence of buffered data for each of the one or more blocks.

An example embodiment of the invention includes an apparatus comprising:

wherein the page control field indicates a mode of encoding a traffic indication map for buffered data in each of the one or more blocks of one or more sub-blocks of one or more wireless client devices and the page control field includes zero or more padding bits to fill out at least one or more octet.

An example embodiment of the invention includes an apparatus comprising:

wherein decoding required for a client device to read buffered data in the traffic indication map, is minimized when the page bitmap field indicates that there is no buffered data in a block associated with the device.

An example embodiment of the invention includes an apparatus comprising:

wherein decoding required for a client device to read buffered data in the traffic indication map, is minimized because the page control field only contains control bits for those blocks identified by the page bitmap field as having buffered data waiting for the device.

An example embodiment of the invention includes an apparatus comprising:

at least one processor;

at least one memory including computer program code;

the at least one memory and the computer program code configured to, with the at least one processor, cause the apparatus at least to:

generate a traffic indication map comprising a page bitmap field, a page control field, and one or more block bitmap fields, indicating wireless client devices having buffered data in the apparatus available for them; and periodically broadcasting the traffic indication map in a beacon frame to the wireless client devices.

An example embodiment of the invention includes an apparatus comprising:

wherein the one or more block bitmap fields represents one or more blocks of the one or more wireless client devices and the page bitmap field indicates presence of buffered data for each of the one or more blocks.

An example embodiment of the invention includes an apparatus comprising:

wherein the page control field indicates a mode of encoding a traffic indication map for buffered data in each of the one or more blocks of the one or more wireless client devices and the page control field includes zero or more padding bits to fill out at least one or more octet.

An example embodiment of the invention includes an apparatus comprising:

wherein the traffic indication map further comprises one or more sub-block bitmap fields representing one or more sub-blocks of the one or more wireless client devices, the one or more block bitmap fields represents the one or more sub-blocks, and the page bitmap field indicates presence of buffered data for each of the one or more blocks.

An example embodiment of the invention includes an apparatus comprising:

wherein the page control field indicates a mode of encoding a traffic indication map for buffered data in each of the one or more blocks of one or more sub-blocks of one or more wireless client devices and the page control field includes zero or more padding bits to fill out at least one or more octet.

An example embodiment of the invention includes a computer program product comprising computer executable program code recorded on a computer readable, non-transitory storage medium, the computer executable program code comprising:

code for receiving by a wireless client device, a traffic indication map in a beacon frame from an access point, the traffic indication map comprising a page bitmap field, a page control field, and one or more block bitmap fields, indicating there is buffered data available in the access point device for one or more wireless client devices;

code for decoding by the wireless client device, the traffic indication map; and code for determining by the wireless client device, that there is buffered data available in the access point device for the wireless client device.

An example embodiment of the invention includes a computer program product comprising computer executable program code recorded on a computer readable, non-transitory storage medium, the computer executable program code comprising:

code for generating in an access point device, a traffic indication map comprising a page bitmap field, a page control field, and one or more block bitmap fields, indicating wireless client devices having buffered data in the access point device available for them; and code for periodically broadcasting the traffic indication map in a beacon frame to the wireless client devices.

The resulting embodiments provide improved power saving in network environments.

DESCRIPTION OF THE FIGURES

FIG. 2B is an example flow diagram of operational steps in the wireless client device of FIG. 2A, wherein the wireless client device receives beacon frame that includes a traffic indication map (TIM) from the wireless access point device, according to an example embodiment of the invention.

FIG. 3B is an example flow diagram of operational steps in the wireless access point device of FIG. 3A, wherein the wireless access point device transmits a beacon frame that includes a traffic indication map (TIM).

DISCUSSION OF EXAMPLE EMBODIMENTS OF THE INVENTION

Figure 1A:
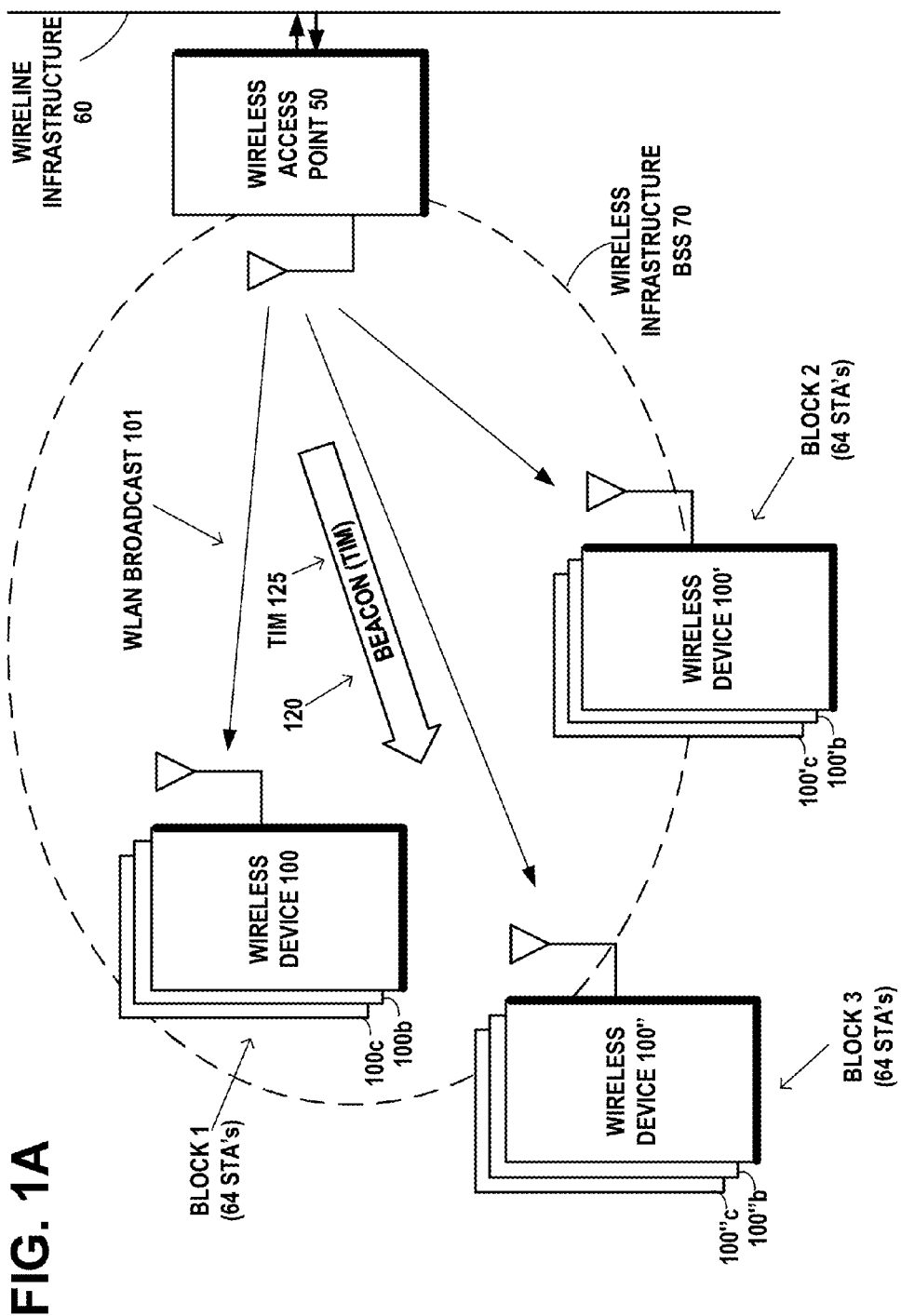
FIG. 1A shows the example network diagram, wherein a wireless access point device transmits a beacon frame with a traffic indication map (TIM) to a plurality of wireless client devices that are logically grouped into blocks for convenience, similarity of operation, or efficiency, according to an example embodiment of the invention.

This section is organized into the following topics:
A. WLAN Communication Technology
B. Efficient TIM Compression and Decoding For Wireless Networks A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11ah WLAN standard is being developed for operation below 1 GHz and will have a greater range and lower obstruction losses due to its longer wavelength.

According to an example embodiment, an IEEE 802.11 WLAN may be organized as an independent basic service set (IBSS) or an infrastructure basic service set (BSS). The access point (AP) in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP.

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

According to an example embodiment, an IEEE 802.11 WLAN may also be organized as an independent basic service set (IBSS). Wireless devices in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format may be identical to that of an IEEE 48-bit address. In an ad hoc network, the BSSID may be a locally administered, individual address that is generated randomly by the device that starts the ad hoc network.

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

A Traffic Indication Map (TIM) is a field transmitted in beacon frames, used to inform associated wireless client devices that the access point has buffered data waiting to be transmitted to them. Access points buffer frames of data for wireless client devices while they are sleeping in a low-power state. The access point transmits beacons at a regular interval, the target beacon transmission time (TBTT). The Traffic Indication Map (TIM) information element in the periodically transmitted beacon frame, indicates which wireless client devices have buffered data waiting to be accessed in the access point. Each frame of buffered data is identified by an association identifier (AID) associated with a specific wireless client device. The AID is used to logically identify the wireless client device to which buffered frames of data are to be delivered. The traffic indication map (TIM) contains a bitmap, with each bit relating to a specific association identifier (AID). When data is buffered in the access point for a particular association identifier (AID), the bit is "1". If no data is buffered, the bit for the association identifier (AID) is "0". Wireless client devices must wake up and listen for the periodic beacon frames to receive the Traffic Indication Map (TIM). By examining the TIM, a wireless client device may determine if the access point has buffered data waiting for it. To retrieve the buffered data, the wireless client device may use a power-save poll (PS-Poll) frame. After transmitting the PS-Poll frame, the client mobile station may stay awake until it receives the buffered data or until the bit for its association identifier (AID) in the Traffic Indication Map (TIM) is no longer set to "1", indicating that the access point has discarded the buffered data.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode may send a trigger frame to the AP when the STA wakes up, to retrieve any queued data at the AP. In S-APSD, the AP assigns a schedule to a STA and the STA wakes up, sends a power save poll packet to the AP in order to retrieve from the AP any data queued. An AP may maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

The IEEE 802.11ah WLAN standard operating below 1 GHz, has a greater range and lower obstruction losses due to its longer wavelength. IEEE 802.11ah provides wireless LAN operation in the sub-1 GHz range considered appropriate for sensor networks, machine-to-machine, cellular offload, and smart grid applications. IEEE 802.11ah defines three use case categories:

Use Case 1: Sensors and meters;
Use Case 2: Backhaul sensor and meter data; and
Use Case 3: Extended range Wi-Fi A principal application of IEEE 802.11ah is sensor networks, for example in smart metering, where the measurement information at each sensor node may be transmitted to an access point. In example sensor applications, the data packet size may be a few hundred bytes, the sensors may have a low duty-cycle, transmitting data every few minutes, and the number of sensor devices may be as large as 6000 devices communicating with an access point.

B. Efficient TIM Compression and Decoding For Wireless Networks

In sensor networks and smart grid applications, large numbers of wireless client devices, both fixed and mobile, will need to communicate with an access point device. In the case of IEEE 802.11ah networks, it is envisioned to have a Wi-Fi network of 6000 wireless client devices (STAs) being served by an access point (AP). The client devices may operate on battery power and must conserve their power during long periods of inactivity punctuated by short durations of communication sessions. The client devices will need to awaken periodically to receive the traffic indication map (TIM) in a beacon, to determine if the access point has buffered data for them. A conventional TIM bitmap with 251 octets has the capacity to inform approximately 2007 STAs. Almost three times this number of octets may be necessary in order to support 6000 STAs. However, such an increase in the number of octets may result in a very large TIM bitmap size.

In accordance with an embodiment of the invention, a data compression technique has been devised to enable access points and client devices to efficiently encode and decode the TIM bitmap.

FIG. 1A shows the example network diagram in accordance with an embodiment of the invention, wherein a wireless access point device 50 that manages a wireless infrastructure BSS 70, transmits in a WLAN broadcast 101, a beacon frame 120 with a traffic indication map (TIM) information element 125 to a plurality of wireless client devices 100, 100', and 100", that are logically grouped into blocks 1, 2, and 3 for convenience, similarity of operation, or efficiency, according to an example embodiment of the invention. Block 1 includes wireless client devices 100, 100b, and 100c. Block 2 includes wireless client devices 100', 100'b, and 100'c. Block 3 includes wireless client devices 100", 100"b, and 100"c. The wireless client device 100 may be a sensor device or a node in a smart grid. Both the wireless client device 100 and the access point device 50 may be devices operating according to the IEEE 802.11ah communications protocol. The access point device 50 may be connected to a wireline infrastructure 60.

Figure 1B:
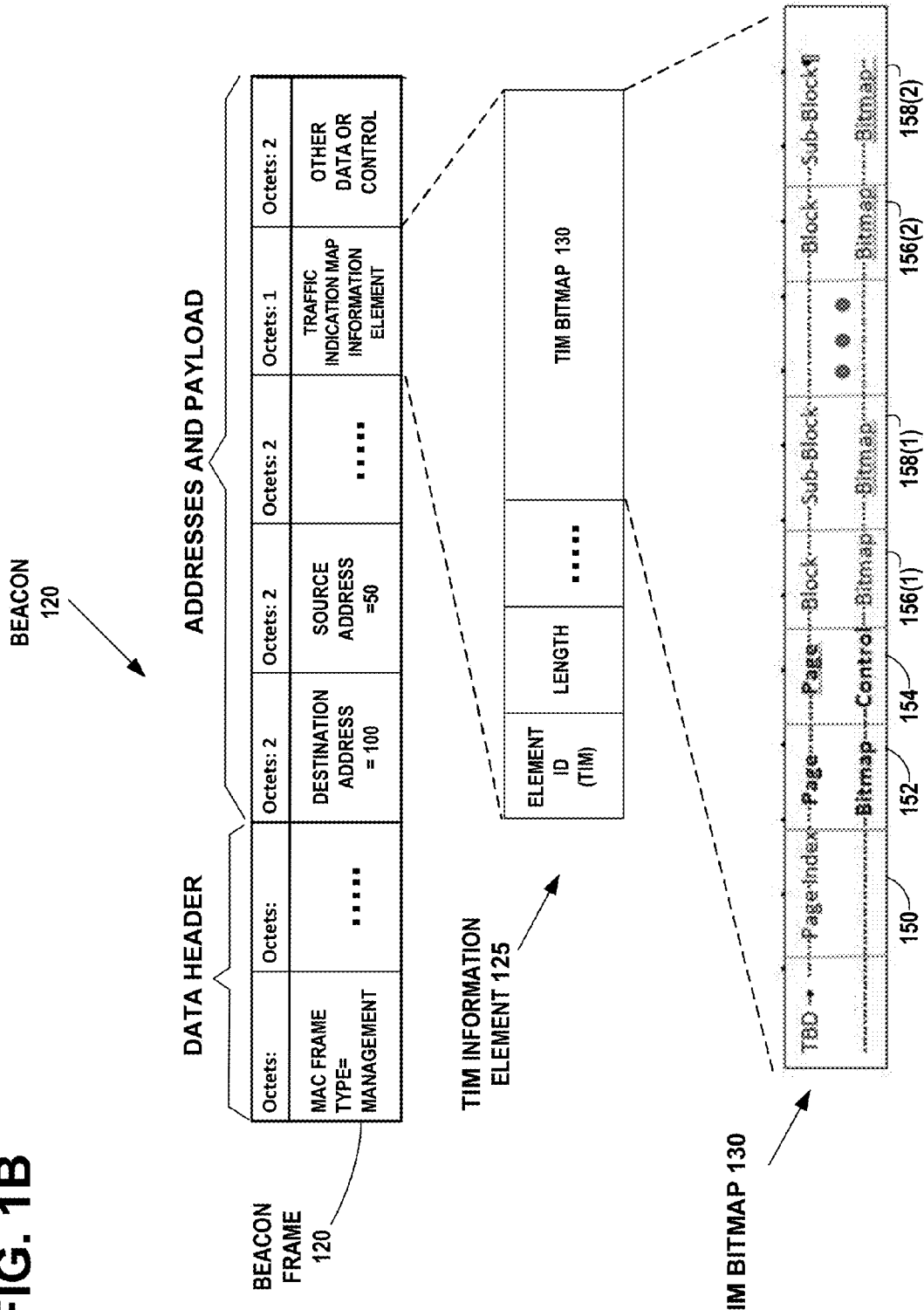
FIG. 1B shows an example frame structure of the beacon frame that includes a traffic indication map (TIM), showing the format of the TIM bitmap, according to an example embodiment of the invention.

FIG. 1B shows an example frame structure of the beacon frame 120 in accordance with an embodiment of the invention, which includes the traffic indication map (TIM) information element 125, showing the format of the TIM bitmap 130 contained within the TIM information element 125, according to an example embodiment of the invention. An example beacon frame structure is shown of an IEEE 802.11ah modified packet frame 120 transmitted from the wireless access point 50 to the wireless client device 100, containing the TIM bitmap 125.

In accordance with an embodiment of the invention, the TIM bitmap 130 may comprise one or more of the page index field 150, the page bitmap field 152, the page control field 154, one or more block bitmap fields 156(1) and 156(2), indicating there is buffered data available in the access point device 50 for one or more wireless client devices. The TIM bitmap 130 may further comprise one or more sub-block bitmap fields 158(1) and 158(2) representing one or more sub-blocks of the one or more wireless client devices 100, 100', 100", etc. The one or more block bitmap fields 156(1) and 156(2) represents the one or more sub-blocks 158(1) and 158(2). The page bitmap field 152 indicates the presence of buffered data for each of the one or more blocks 162. The page control field 154 may indicate a mode of encoding the TIM bitmap for buffered data only for those blocks for which there is buffered data.

A value of "01" in the page control field 154 may indicate the block bitmap encoding mode, where the n-th bit position in the block bitmap indicates whether the n-th sub-block bitmap is present in the sub-block bitmap field and the m-th bit position of the sub-block bitmap 158 indicates whether the m-th STA has data buffered at the access point 50.

A value of "10" in the page control field 154 may indicate the single AID encoding mode, when there is buffered data for a single AID in a Block. In the single AID encoding mode, the 8 bits of the block bitmap field 156 is used to indicate the 8 lowest significant bits (LSBs) of the AID. In the single AID encoding mode, the sub-block field 158 is not present A value of "11" in the page control field 154 may indicate the inverse bitmap mode, where if there are many "1s" in the bitmap of a block, inverse of the bitmap is encoded.

Figure 1C:
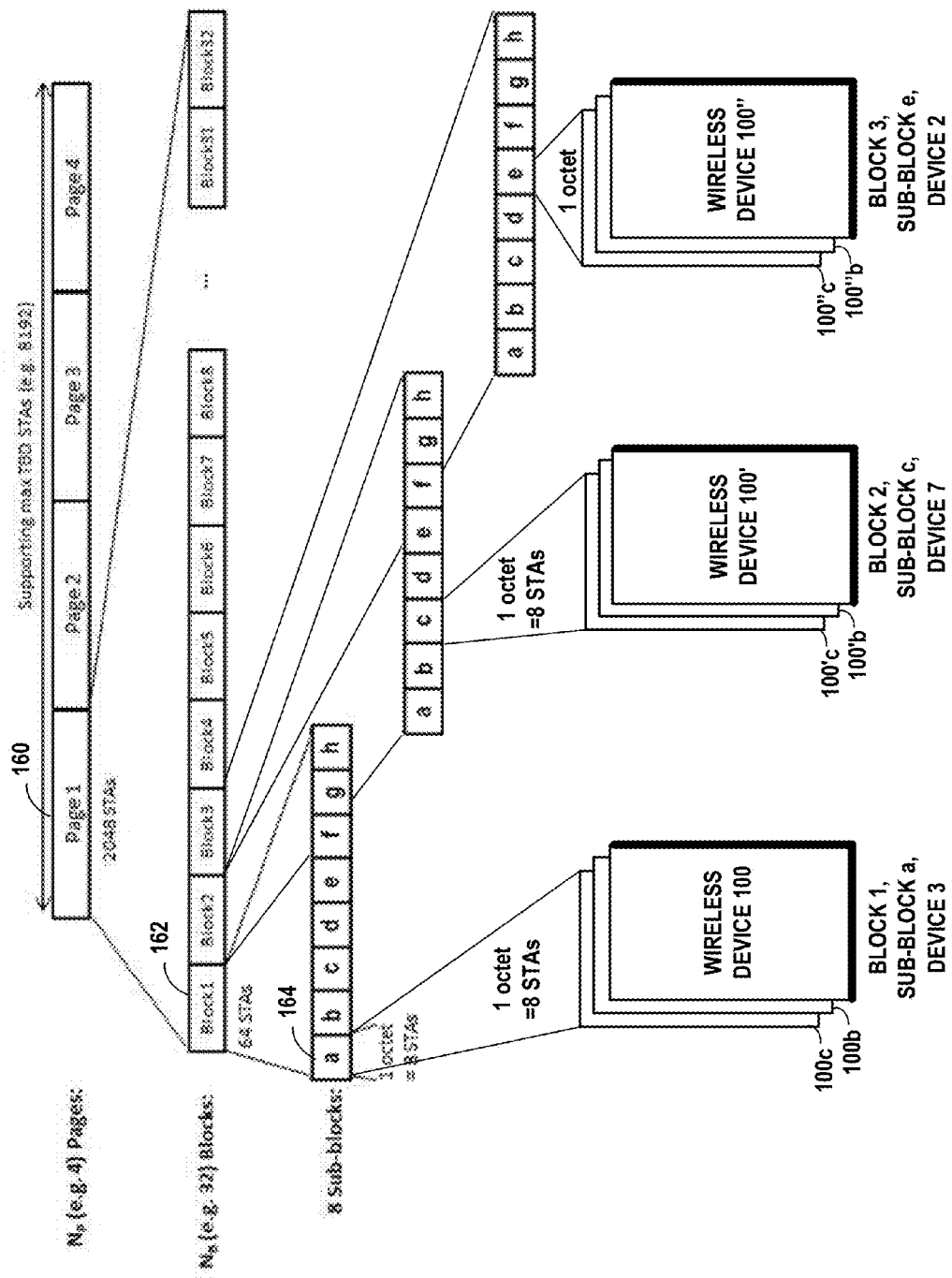
FIG. 1C shows an example three level hierarchy of the traffic indication map (TIM) as a page, block, and sub-block structure, wherein the total association identifier (AID) space is divided into a hierarchical arrangement of small blocks for the wireless client devices and only the sub-blocks with non-zero values are transmitted by the access point in its beacon frames, according to an example embodiment of the invention.

FIG. 1C shows an example of a three level hierarchy of the traffic indication map (TIM) bitmap 130 in accordance with an embodiment of the invention, in terms of a page 160, block 162, and sub-block 164, wherein the total association identifier (AID) space for a page 160 is divided into a hierarchical arrangement of 32 blocks 162, identified in the FIG. 1C as Block1, Block2, . . . Block32, each containing 64 wireless client devices (STAs). The blocks 162 are further divided into one or more sub-blocks 164, with each sub-block including eight wireless client devices. The one or more block bitmap fields 156 represents the one or more sub-blocks 158.

In accordance with an example embodiment of the invention, the page bitmap field 152 and page control field 154 enable a significant compression of the data in the traffic indication map 125. In accordance with an embodiment of the invention, the page bitmap field 152 indicates the presence of buffered data only for the one or more blocks 162 that have buffered data. The TIM bitmap 130 comprises only block bitmaps 156 of those blocks 162 with non-zero values in the page bitmap field 152. Similarly, the TIM bitmap 130 comprises only sub-block bitmaps 158 of those sub-blocks 164 with non-zero values in the corresponding block bitmap field 156. The control bits in the page control 154 are only needed for those few blocks 162 that have buffered data.

In accordance with an example embodiment of the invention, the page bitmap field 152 and page control field 154 enable a significant reduction in the time required for a client device to read the data in the traffic indication map 125. The claimed page bitmap field 152 and page control field 154 eliminate the need for a client device to read its block bitmap 156 if there is no data for its block 164, as indicated by the page bitmap field 152.

To illustrate the significant improvement in data compression and decoding speed provided by an example embodiment of the invention, a comparison may be made with an example block offset encoding scheme for a traffic indication map. An example block offset encoding scheme for buffered data in all 32 blocks would use block offset values to designate each of the 32 blocks 162 in a page 160 and would use block control bits to indicate a mode of encoding for each of those 32 blocks, for a traffic indication map. In such an example block offset encoding scheme, a block offset field and a block control field would be required for each of the 32 blocks in a page. Assuming, for example, that five bits would be required in each block offset field to designate one of 32 blocks, that three bits would be required in each block control field for block control, and that eight bits would be required in each block bitmap to designate sub-blocks, a total of two bytes of information would be required in such a traffic indication map for each of the 32 blocks within a page. A client device corresponding to a P-th block, must decode all of the preceding (P−1)*2 bytes before being informed about the status of its buffered data, whether or not there is buffered data waiting.

Thus, it is seen that an example embodiment of the invention enables a significant compression of the data in the traffic indication map 125 and enables a significant reduction in the time required for a client device to read the data in the traffic indication map 125.

In accordance with an example embodiment of the invention, the decoding required for a client device to read buffered data in the traffic indication map, is minimized when the page bitmap field 152 indicates that there is no buffered data in a block 162 associated with the device.

In accordance with an example embodiment of the invention, the decoding required for a client device to read buffered data in the traffic indication map, is minimized because the page control field 154 only contains control bits for those blocks 162 identified by the page bitmap field 152 as having buffered data waiting for the device.

In accordance with an example embodiment of the invention, the page bitmap field 152 and page control field 154 enable the offset among 32 blocks 162 to be easily detected. For each block 162, the block bitmap field 156 refers to the status of buffered data per sub-block 164 out of eight sub-blocks. This may be illustrated with the following example:

Page Index: 01, Page Bitmap: 01110 . . . 0110 (32 bits); Page Control: 0101010101, Zero Padding: 000000 Block Bitmap: 00000001; Sub-Blocks: 00000000 . . . 1 These expressions are concatenated to be transmitted in the traffic indication map as:

0101110 . . . 011001010101010000000000000010000 000000 . . . 00000001

In this example, there is buffered data for blocks 2, 3, 4, . . . , 30, and 31. The page control field 154 is 01 for all five blocks, indicating the single AID mode of encoding. Six bits are added to the page control field 154 as zero padding to make an octet out of page control and zero padding. The block bitmap 156 is for the first block 162, where presence of data is implied for the 64th STA in the last sub-block 164. This information is available from the page bitmap field 152. Based on the page bitmap field 152 of 01110 . . . 0110, the block offset is 2. The block bitmap field 156 is mapped to page bitmap field 152 and the fields for the TIM Bitmap for each Block are considered to be ordered and related to the order of the page bitmap field 152.

In accordance with an example embodiment of the invention, it may thus be seen that the page bitmap field 152 and page control field 154 would render as redundant the block offset field and the block control field of an example block offset encoding scheme for a traffic indication map.

To illustrate the significant improvement in the encoding efficiency provided by an example embodiment of the invention, a comparison may be made with the example block offset encoding scheme for a traffic indication map.

Case I: Buffered data for 10 Blocks out of 32 Blocks with no page segmentation

A. Example block offset encoding scheme:

Block Control for 10 Blocks: 3*10=30 bits

Block Offset for 10 Blocks: 5*10=50 bits

Total number of bits for the TIM bitmap: 80 bits (considering no change in Page Index, Block Bitmap, and Sub-Block Bitmaps).

B. An example embodiment of the invention:

Page Bitmap: 32 bits

Page Control: 2*10=20 bits (2 bits to indicate Block Control for each of the 10 Blocks)

Zero Padded bits: 4 bits (to make it aligned with octet structure based on 20 bits in Page Control)

Total number of bits: 56 bits

Therefore, an example embodiment of the invention has a savings of (80−56)=24 bits (i.e., 3 octets savings) with increased Bitmap Control field and compressed TIM.

Case II: Buffered data for all 32 Blocks with no page segmentation
A. Example block offset encoding scheme:
Block Control for 10 Blocks: 3*32=96 bits
Block Offset for 10 Blocks: 5*32=160 bits
Total number of bits for the TIM bitmap: 256 bits (considering no change in Page Index, Block Bitmap, and Sub-Block Bitmaps).
B. An example embodiment of the invention:
Page Bitmap: 32 bits
Page Control: 2*32=64 bits (2 bits to indicate Block Control for each of the 10 Blocks)
Zero Padded bits: 0 bits (to make it aligned with octet structure based on 20 bits in Page Control)
Total number of bits: 96 bits Therefore, an example embodiment of the invention has a savings of (256−96)=160 bits (i.e., 20 octets savings) with increased Bitmap Control field and compressed TIM.

In accordance with an example embodiment of the invention, it may thus be seen that an example embodiment of the invention leads to significant compression of TIM and results in efficient TIM encoding.

In accordance with an example embodiment of the invention, the access point 50 may encode the TIM bitmap 130 of FIG. 1B, for the three wireless client devices 100, 100', and 100" in FIG. 1C, as follows.

The page index field 150 is "01", which represents the first of four pages, each page representing 2048 wireless client devices.

In this example, each of the wireless client devices 100, 100', and 100" in the respective Block1, Block2, and Block3, has buffered data in the access point, and thus the 32-bit page bitmap field 152 is "111000 . . . 000", where the first, second, and third bit positions have a "1" and the remaining bit positions have a "0".

The first wireless client device 100 in FIG. 1C is located in the first sub-block "a" of the first Block1, and thus the block bitmap field 156 is "10000000", where the first bit position has a "1" and the remaining bit positions have a "0". The first wireless client device 100 is the third device in sub-block "a" and thus the sub-block bitmap field 158 is "00100000", where the third bit position has a "1" and the remaining bit positions have a "0".

The second wireless client device 100' in FIG. 1C is located in the third sub-block "c" of the second Block2, and thus the block bitmap field 156 is "00100000", where the third bit position has a "1" and the remaining bit positions have a "0". The second wireless client device 100' is the seventh device in sub-block "c" and thus the sub-block bitmap field 158 is "00000010", where the seventh bit position has a "1" and the remaining bit positions have a "0".

The third wireless client device 100" in FIG. 1C is located in the fifth sub-block "e" of the third Block3, and thus the block bitmap field 156 is "00001000", where the fifth bit position has a "1" and the remaining bit positions have a "0". The third wireless client device 100" is the second device in sub-block "e" and thus the sub-block bitmap field 158 is "01000000", where the second bit position has a "1" and the remaining bit positions have a "0".

The access point 50 may code the TIM bitmap 130 of FIG. 1B, by concatenating the fields for the three wireless client devices 100, 100', and 100" in FIG. 1C, as follows.

In this example, the page control field 154 indicates the same mode of encoding for each of the three blocks, Block1, Block2, and Block3, for example a value of "01" in the page control field 154 indicates the block bitmap encoding mode, where the n-th bit position of the block bitmap 156 indicates whether the n-th sub-block bitmap is present in the sub-block field 158 and the m-th bit position of the sub-block bitmap 158 indicates whether the m-th STA has data buffered at the access point 50. Since there are three blocks identified in the page bitmap field, the page control field 154 is "010101". Since these six bits are less than a full octet, two zero-padding bits "00" are added at the most significant bit (MSB) end, resulting in the padded page control field 154 being "01010100".

The access point 50 may encode the TIM bitmap 130 of FIG. 1B, by concatenating the above fields for the three wireless client devices 100, 100', and 100" in FIG. 1C, as follows.

The page index field 150 is "01";
The 32-bit page bitmap field 152 is "111000 . . . 000";
The zero-padded page control field 154 is "01010100";
For the first wireless client device 100, the block bitmap field 156 is "10000000" and the sub-block bitmap field 158 is "00100000";
For the second wireless client device 100', the block bitmap field 156 is "00100000" and the sub-block bitmap field 158 is "00000010"; and
For the third wireless client device 100", the block bitmap field 156 is "00001000" and the sub-block bitmap field 158 is "01000000".

The concatenated expression of the above fields is encoded by the access point 50 for the TIM bitmap 130 of FIG. 1B, in accordance with an example embodiment of the invention.

In accordance with an example embodiment of the invention, the method of block encoding/decoding does not require STAs from rare blocks to decode the entire set of bytes before being informed of the status of their buffered data. In accordance with an example embodiment of the invention, significant compression in the TIM bitmap is achieved. In accordance with an example embodiment of the invention, the encoding scheme assists in significant TIM compression within the beacon frame.

In accordance with an example embodiment of the invention, the TIM encoding method converts the non-octet division of the TIM bitmap into an octet division of the TIM bitmap. In accordance with an example embodiment of the invention, the Page bitmap is a 32 bit field indicating the presence of buffered data for each of the 32 Blocks. The Page Control is a variable field (2-64 bits), where 2 bits per block are used to indicate the mode of encoding, such as encoding by block bitmap, singled AID, or inverse bitmap mode. The Zero Padding field is variable (0-6 bits) and based on the number of bits in the page control field, so that the sum of Page Control bits and Zero Padding bits is mod 8=0.

In accordance with an example embodiment of the invention, different numbers of sub-blocks may be employed per TIM segment, if TIM segmentation is performed, as indicated within a beacon frame and the page bitmap may also be modified accordingly to the value of the sub-multiple. For example, the above mentioned 32 bit page bitmap may be adjusted to an 8 bit bitmap, if each TIM segment consists of 8 sub-blocks.

In accordance with an example embodiment of the invention, within the beacon frame, 4 octets of the page bitmap may be added for all 32 blocks per page defined in the page index field. The page bitmap field may provide the status of buffered data for each block. Each bit in the bitmap indicates the status of each block. In accordance with an example embodiment of the invention, the information in the page bitmap is ordered based on the block number in one page. For example, if bit 4 in the page bitmap within a page with corresponding page index is set to 1, then it indicates that any of the 64 STAs within block 4 has buffered data at the AP. If the bit was set to 0, it indicates that none of the STAs within block 4 has buffered data at the AP. Hence, the STAs within block 4 need not decode the TIM bitmap and may go to sleep immediately after parsing based on the page bitmap field.

In accordance with an example embodiment of the invention, the offset among 32 blocks may be easily detected from the page bitmap field. Therefore, for each block, all that is needed is the block bitmap field, which refers to status of buffered data per sub-block out of 8 sub-blocks.

In accordance with an example embodiment of the invention, the fields for the TIM bitmap for each block are ordered and related to the order of the page bitmap.

In accordance with an example embodiment of the invention, a significant compression of TIM is obtained, which results from efficient TIM encoding.

Figure 2A:
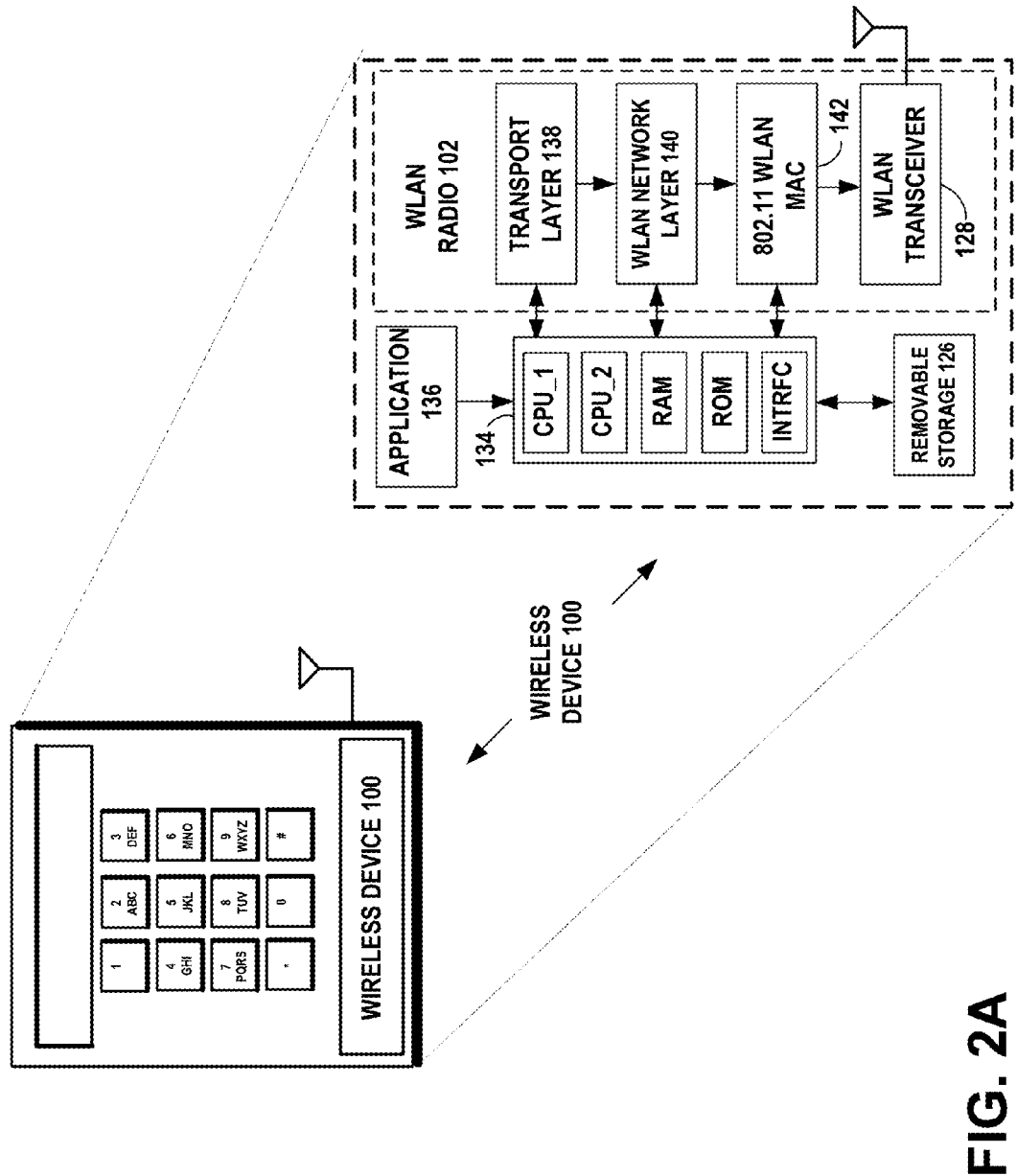
FIG. 2A is an example functional block diagram, illustrating an example wireless client device, according to an example embodiment of the invention.

FIG. 2A is an example functional block diagram, illustrating an example wireless client device 100, according to an example embodiment of the invention. The example wireless client device 100 may include a processor 134 that may include a dual or multi-core central processing unit CPU_1 and CPU_2, a RAM memory, a ROM memory, and an interface for a keypad, display, and other input/output devices. The example wireless client device 100 may include a protocol stack, including the transceiver 128 and IEEE 802.11 MAC 142, which may be based, for example, on the IEEE 802.11ah WLAN standard. The protocol stack may also include a network layer 140, a transport layer 138, and an application program 136.

Figure 4:
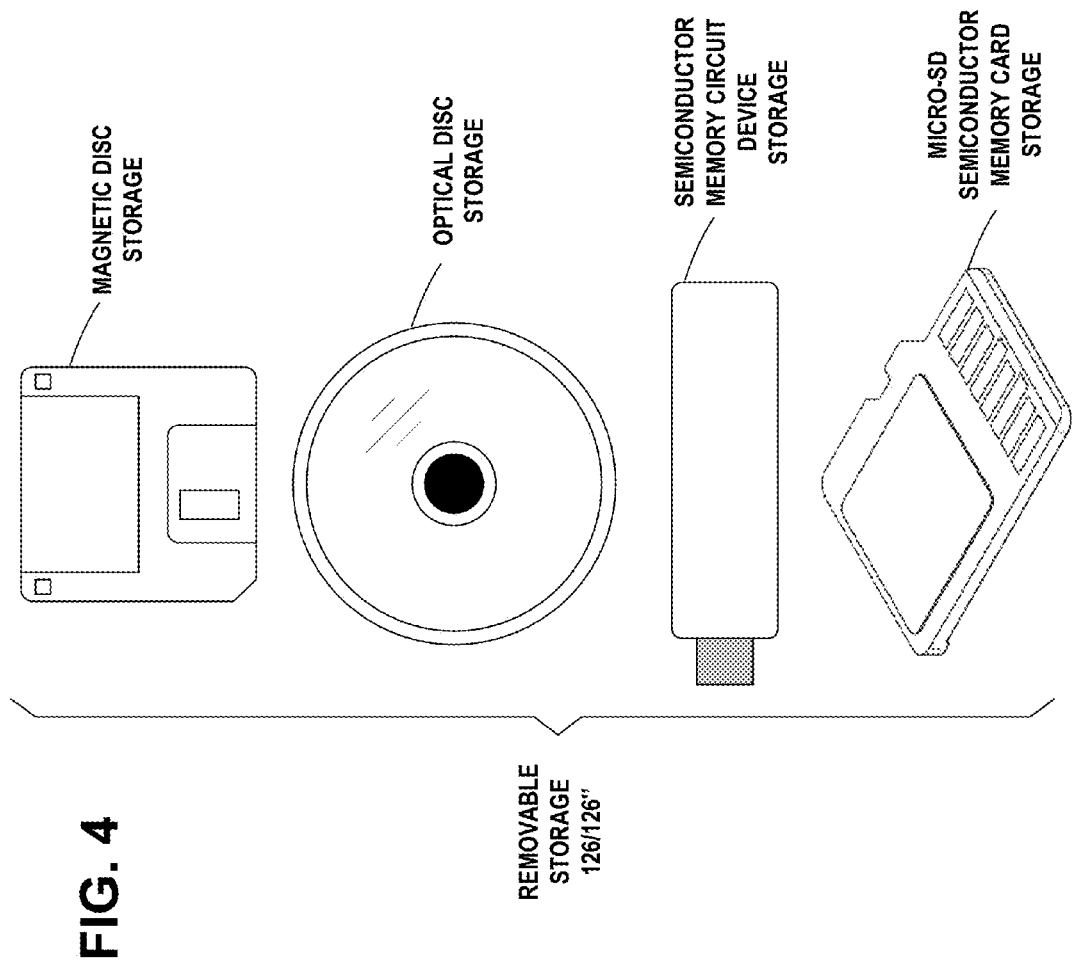
FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment, the interface circuits in FIG. 2A may interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 4, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, the wireless client device 100 of FIG. 2A, comprises:

at least one processor 134;

at least one memory, RAM, ROM, and/or removable storage 126 including computer program code represented by the flow diagram of FIG. 2B;

the at least one memory and the computer program code configured to, with the at least one processor, cause the wireless client device 100 at least to:

receive a traffic indication map 125 in a beacon frame 120 from an access point 50, the traffic indication map comprising a page bitmap field 152, a page control field 154, one or more block bitmap fields 156, and one or more sub-block bitmap fields 158 indicating there is buffered data available in the access point device for one or more wireless client devices;

decode the traffic indication map 125; and determine that there is buffered data available in the access point device 50 for the wireless client device 100.

FIG. 2B is an example flow diagram 200 of operational steps in the wireless client device 100 of FIG. 2A, wherein the wireless client device 100 receives from the wireless access point device 50, a beacon frame 120 from the wireless access point device, including traffic indication map (TIM) 125 indicating an availability of buffered data frames, according to an example embodiment of the invention.

The steps of the flow diagram 200 of FIG. 2B may represent computer code instructions stored in the RAM and/or ROM memory of the wireless client device 100, which when executed by the central processing units (CPU), carry out the functions of an example embodiment of the invention. The steps may be carried out in another order than shown and individual steps may be combined or separated into component steps.

Step 202: receiving by a wireless client device, a traffic indication map in a beacon frame from an access point, the traffic indication map comprising a page bitmap field, a page control field, one or more block bitmap fields, and one or more sub-block bitmap fields indicating there is buffered data available in the access point device for one or more wireless client devices;

Step 204: decoding by the wireless client device, the traffic indication map; and Step 206: determining by the wireless client device, that there is buffered data available in the access point device for the wireless client device.

Figure 3A:
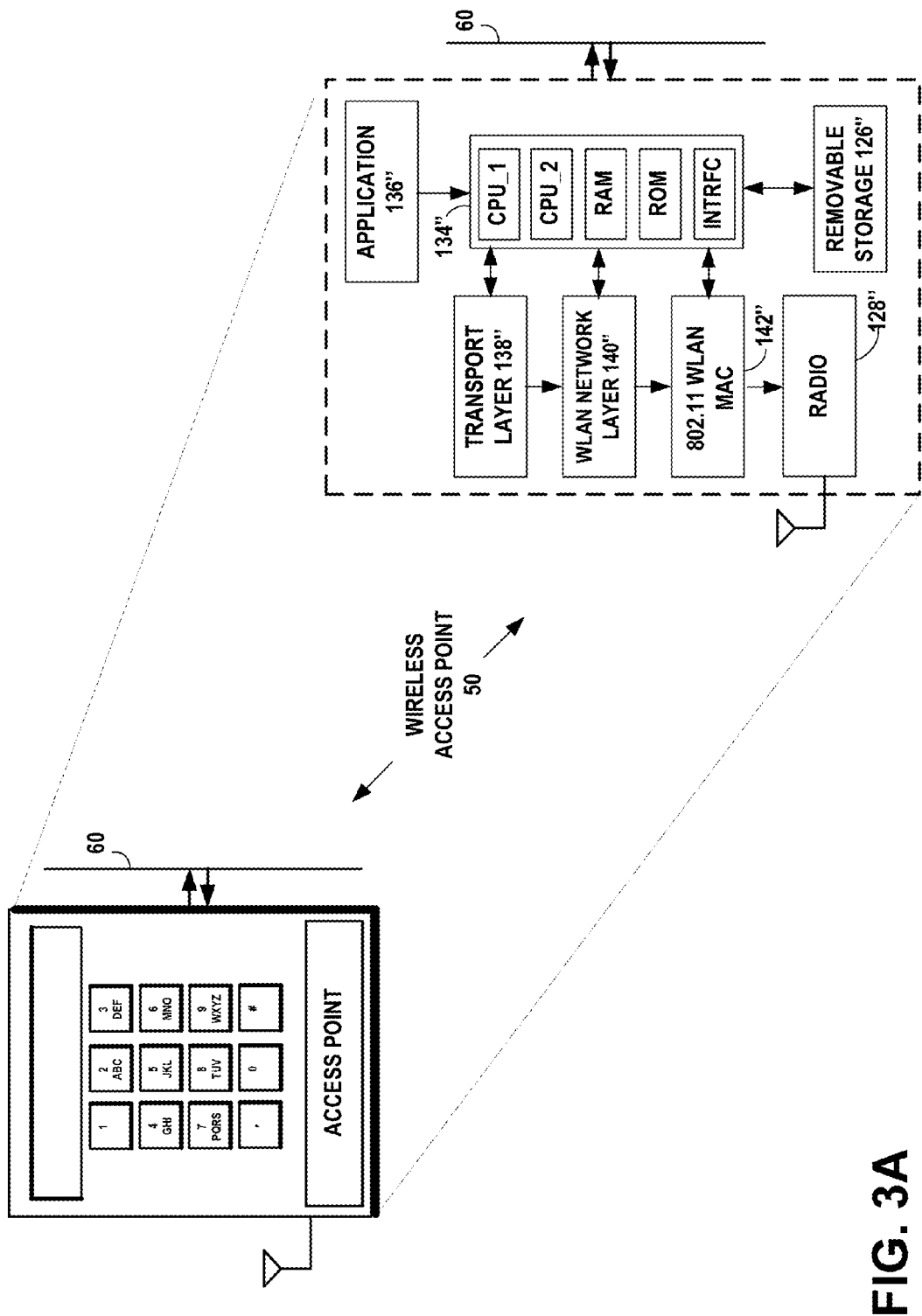
FIG. 3A is an example functional block diagram, illustrating an example wireless access point device, according to an example embodiment of the invention.

FIG. 3A is an example functional block diagram, illustrating an example wireless access point device 50, according to an example embodiment of the invention. The example wireless access point device 50 may include a processor 134" that may include a dual or multi-core central processing unit CPU_1 and CPU_2, a RAM memory, a ROM memory, and an interface for a keypad, display, and other input/output devices. The example wireless access point device 50 may include a protocol stack, including the transceiver 128" and IEEE 802.11ah MAC 142", which may be based, for example, on the IEEE 802.11ah WLAN standard. The protocol stack may also include a network layer 140", a transport layer 138", and an application program 136".

In an example embodiment, the interface circuits in FIG. 3A may interface with one or more radio transceivers, battery and other power sources, key pad, touch screen, display, microphone, speakers, ear pieces, camera or other imaging devices, etc. The RAM and ROM may be removable memory devices 126" such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126", as shown in FIG. 4, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, the wireless access point device 50 of FIG. 3A, comprises:

at least one processor 134";

at least one memory, RAM, ROM, and/or removable storage 126" including computer program code represented by the flow diagram of FIG. 3B;

the at least one memory and the computer program code configured to, with the at least one processor, cause the wireless access point device 50 at least to:

generate a traffic indication map 125 comprising a page bitmap field 152, a page control field 154, one or more block bitmap fields 156, and one or more sub-block bitmap fields 158 indicating there is buffered data available in the access point device 50 for one or more wireless client devices 100; and periodically broadcasting the traffic indication map 125 in a beacon frame 120 to the wireless client devices 100.

FIG. 3B is an example flow diagram 300 of operational steps in the wireless access point device 50 of FIG. 3A, wherein the wireless access point device generates a traffic indication map (TIM) 125 indicating an availability of buffered data frames for wireless client devices and broadcasts the traffic indication map (TIM) 125 in a beacon frame 120 to the wireless client devices, according to an example embodiment of the invention.

The steps of the flow diagram 300 of FIG. 3B may represent computer code instructions stored in the RAM and/or ROM memory, which when executed by the central processing units (CPU), carry out the functions of an example embodiment of the invention. The steps may be carried out in another order than shown and individual steps may be combined or separated into component steps.

Step 302: generating in an access point device, a traffic indication map comprising a page bitmap field, a page control field, one or more block bitmap fields, and one or more sub-block bitmap fields indicating wireless client devices having buffered data in the access point device available for them; and Step 304: periodically broadcasting the traffic indication map in a beacon frame to the wireless client devices.

FIG. 4 illustrates an example embodiment of the invention, wherein examples of removable storage media 126 and 126" are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, wireless networks having a need for traffic indication map (TIM) compression, may include other sensor type networks and/or other networks having a large number of supported stations/apparatuses. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN.

In accordance with an example embodiment of the invention, the wireless client device 100 may be, for example, a miniature device such as a key fob, smart card, jewelry, or the like. The wireless client device 100 may be, for example, a larger device such as a cell phone, smart phone, flip-phone, PDA, graphic pad, or even larger devices such as a laptop computer, an automobile, and the like.

In an example embodiment of the invention, an apparatus comprises:

means for receiving by a wireless client device, a traffic indication map in a beacon frame from an access point, the traffic indication map comprising a page bitmap field, a page control field, and a block bitmap field, indicating there is buffered data available in the access point device for one or more wireless client devices;

means for decoding by the wireless client device, the traffic indication map; and means for determining by the wireless client device, that there is buffered data available in the access point device for the wireless client device.

In an example embodiment of the invention, an apparatus comprises:

means for generating in an access point device, a traffic indication map comprising a page bitmap field, a page control field, and a block bitmap field indicating wireless client devices having buffered data in the access point device available for them; and means for periodically broadcasting the traffic indication map in a beacon frame to the wireless client devices.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:
    receiving by a wireless client device, a traffic indication map in a beacon frame from an access point, the traffic indication map comprising a page bitmap field, a page control field, and one or more block bitmap fields, indicating there is buffered data available in the access point device for one or more wireless client devices, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap;
    decoding by the wireless client device, the traffic indication map; and
    determining by the wireless client device, that there is buffered data available in the access point device for the wireless client device.

2. The method of claim 1, wherein the one or more block bitmap fields represents presence or absence of buffered data for one or more sub-blocks of the one or more wireless client devices and the page bitmap field indicates presence of buffered data for each of the one or more blocks.

3. The method of claim 2, wherein the page control field indicates a mode of encoding a traffic indication map for buffered data in each of the one or more blocks of the one or more wireless client devices and the page control field includes zero or more padding bits to fill out at least one or more octet.

4. The method of claim 1, wherein the traffic indication map further comprises one or more sub-block bitmap fields representing buffered data information for one or more sub-blocks in one block, a block bitmap field indicating presence of buffered data for the one or more sub-blocks, and the page bitmap field indicating presence of buffered data for each of the one or more blocks.

5. The method of claim 4, wherein the page control field indicates a mode of encoding a traffic indication map for buffered data in each of the one or more blocks for the one or more sub-blocks of one or more wireless client devices and the page control field includes zero or more padding bits to fill out at least one or more octet.

6. The method of claim 1, wherein decoding required for a client device to read buffered data in the traffic indication map, is minimized when the page bitmap field indicates that there is no buffered data in a block associated with the device.

7. The method of claim 1, wherein decoding required for a client device to read buffered data in the traffic indication map, is minimized because the page control field only contains control bits for those blocks identified by the page bitmap field as having buffered data waiting for the device.

8. A method, comprising:
    generating in an access point device, a traffic indication map comprising a page bitmap field, a page control field, and one or more block bitmap fields, indicating wireless client devices having buffered data in the access point device available for them, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap; and
    periodically broadcasting the traffic indication map in a beacon frame to the wireless client devices.

9. The method of claim 8, wherein the traffic indication map further comprises one or more sub-block bitmap fields representing buffered data information for one or more sub-blocks in one block, a block bitmap field indicating presence of buffered data for the one or more sub-blocks, and the page bitmap field indicating presence of buffered data for each of the one or more blocks.

10. The method of claim 9, wherein the page control field indicates a mode of encoding a traffic indication map for buffered data in each of the one or more blocks of the one or more sub-blocks of one or more wireless client devices and the page control field includes zero or more padding bits to fill out at least one or more octet.

11. The method of claim 8, wherein the one or more block bitmap fields represents buffered data information for one or more sub-blocks of the one or more wireless client devices and the page bitmap field indicates presence of buffered data for each of the one or more blocks.

12. The method of claim 11, wherein the page control field indicates a mode of encoding a traffic indication map for buffered data in each of the one or more blocks of the one or more wireless client devices and the page control field includes zero or more padding bits to fill out at least one or more octet.

13. An apparatus, comprising:
    at least one processor;
    at least one memory including computer program code;
    the at least one memory and the computer program code configured to, with the at least one processor, cause the apparatus at least to:
    receive a traffic indication map in a beacon frame from an access point, the traffic indication map comprising a page bitmap field, a page control field, and one or more block bitmap fields, indicating there is buffered data available in the access point device for one or more wireless client devices, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap;
    decode the traffic indication map; and
    determine that there is buffered data available in the access point device for the apparatus.

14. The apparatus of claim 13, wherein the traffic indication map further comprises one or more sub-block bitmap fields representing buffered data information for one or more sub-blocks in one block, a block bitmap field indicating presence of buffered data for the one or more sub-blocks, and the page bitmap field indicating presence of buffered data for each of the one or more blocks.

15. The apparatus of claim 14, wherein the page control field indicates a mode of encoding a traffic indication map for buffered data in each of the one or more blocks of the one or more sub-blocks of one or more wireless client devices and the page control field includes zero or more padding bits to fill out at least one or more octet.

16. The apparatus of claim 13, wherein the one or more block bitmap fields represents presence or absence of buffered data for one or more sub-blocks of the one or more wireless client devices and the page bitmap field indicates presence of buffered data for each of the one or more blocks.

17. The apparatus of claim 16, wherein the page control field indicates a mode of encoding a traffic indication map for buffered data in each of the one or more blocks of the one or more wireless client devices and the page control field includes zero or more padding bits to fill out at least one or more octet.

18. The apparatus of claim 13, wherein decoding required for a client device to read buffered data in the traffic indication map, is minimized when the page bitmap field indicates that there is no buffered data in a block associated with the device.

19. The apparatus of claim 13, wherein decoding required for a client device to read buffered data in the traffic indication map, is minimized because the page control field only contains control bits for those blocks identified by the page bitmap field as having buffered data waiting for the device.

20. An apparatus, comprising:
at least one processor;
at least one memory including computer program code;
the at least one memory and the computer program code configured to, with the at least one processor, cause the apparatus at least to:
generate a traffic indication map comprising a page bitmap field, a page control field, and one or more block bitmap fields, indicating wireless client devices having buffered data in the apparatus available for them, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap; and
periodically broadcasting the traffic indication map in a beacon frame to the wireless client devices.

21. The apparatus of claim 20, wherein the one or more block bitmap fields represents buffered data information for one or more sub-blocks of the one or more wireless client devices and the page bitmap field indicates presence of buffered data for each of the one or more blocks.

22. The apparatus of claim 21, wherein the page control field indicates a mode of encoding a traffic indication map for buffered data in each of the one or more blocks of the one or more wireless client devices and the page control field includes zero or more padding bits to fill out at least one or more octet.

23. The apparatus of claim 20, wherein the traffic indication map further comprises one or more sub-block bitmap fields representing buffered data information for one or more sub-blocks in one block, a block bitmap field indicating presence of buffered data for the one or more sub-blocks, and the page bitmap field indicating presence of buffered data for each of the one or more blocks.

24. The apparatus of claim 23, wherein the page control field indicates a mode of encoding a traffic indication map for buffered data in each of the one or more blocks of the one or more sub-blocks of one or more wireless client devices and the page control field includes zero or more padding bits to fill out at least one or more octet.

25. A computer program product comprising computer executable program code recorded on a computer readable, non-transitory storage medium, the computer executable program code comprising:
code for receiving by a wireless client device, a traffic indication map in a beacon frame from an access point, the traffic indication map comprising a page bitmap field, a page control field, and one or more block bitmap fields, indicating there is buffered data available in the access point device for one or more wireless client devices, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap;
code for decoding by the wireless client device, the traffic indication map; and
code for determining by the wireless client device, that there is buffered data available in the access point device for the wireless client device.

26. A computer program product comprising computer executable program code recorded on a computer readable, non-transitory storage medium, the computer executable program code comprising:
code for generating in an access point device, a traffic indication map comprising a page bitmap field, a page control field, and one or more block bitmap fields, indicating wireless client devices having buffered data in the access point device available for them, wherein the page bitmap field indicates presence or absence of buffered data for blocks of a page, and wherein the page control field indicates a mode of encoding the traffic indication map for the blocks for which there is buffered data, wherein at least two of the following modes of encoding are supported: block bitmap, single association identifier, and inverse bitmap; and
code for periodically broadcasting the traffic indication map in a beacon frame to the wireless client devices.

* * * * *